United States Patent
Reimann

(10) Patent No.: US 11,729,568 B2
(45) Date of Patent: Aug. 15, 2023

(54) ACOUSTIC SIGNATURES IN A PLAYBACK SYSTEM

(71) Applicant: Sonos, Inc., Santa Barbara, CA (US)

(72) Inventor: Robert Reimann, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 17/023,344

(22) Filed: Sep. 16, 2020

(65) Prior Publication Data

US 2021/0006916 A1  Jan. 7, 2021

Related U.S. Application Data

(63) Continuation of application No. 16/102,689, filed on Aug. 13, 2018, now Pat. No. 10,904,685, which is a
(Continued)

(51) Int. Cl.
*H04N 21/422* (2011.01)
*H04R 29/00* (2006.01)
(Continued)

(52) U.S. Cl.
CPC ........... *H04R 29/007* (2013.01); *G06F 3/165* (2013.01); *G06F 3/167* (2013.01); *G06F 16/60* (2019.01);
(Continued)

(58) Field of Classification Search
CPC ......... G10L 19/018; G06F 3/16; G06F 3/162; G06F 3/165; G06F 3/167; G06F 3/04817;
(Continued)

(56) References Cited

U.S. PATENT DOCUMENTS

| 4,995,778 A | 2/1991 | Bruessel |
| 5,440,644 A | 8/1995 | Farinelli et al. |

(Continued)

FOREIGN PATENT DOCUMENTS

| EP | 0772374 A2 | 5/1997 |
| EP | 1133896 B1 | 8/2002 |

(Continued)

OTHER PUBLICATIONS

Advisory Action dated Sep. 15, 2017, issued in connection with U.S. Appl. No. 14/558,944, filed Dec. 3, 2014, 5 pages.
(Continued)

*Primary Examiner* — Thomas H Maung

(57) ABSTRACT

A first computing device is configured to establish a communication path with a second computing device and receive, from the second computing device over the communication path, an indication to begin transmitting an audio tone comprising identifying information for the first computing device, where the audio tone, when detected by the second computing device, causes the second computing device to update a user interface of the second computing device. Based on the received indication, the first computing device begins transmitting the audio tone. The second computing device is configured to detect, via at least one microphone, the audio tone and then, based on the detected audio tone, update the user interface.

30 Claims, 8 Drawing Sheets

Related U.S. Application Data continuation of application No. 14/558,944, filed on Dec. 3, 2014, now Pat. No. 10,051,397, which is a continuation of application No. 13/568,993, filed on Aug. 7, 2012, now Pat. No. 8,930,005.

(51) Int. Cl.

| | | |
|---|---|---|
| *G06F 16/60* | (2019.01) | |
| *H04R 27/00* | (2006.01) | |
| *H04N 21/485* | (2011.01) | |
| *G06F 3/16* | (2006.01) | |
| *G10L 19/018* | (2013.01) | |
| *H03F 3/181* | (2006.01) | |
| *H03G 5/16* | (2006.01) | |
| *H04N 21/472* | (2011.01) | |
| *H04N 21/45* | (2011.01) | |
| *G06F 21/16* | (2013.01) | |
| *H04L 12/28* | (2006.01) | |
| *H04N 21/442* | (2011.01) | |
| *G06F 3/04817* | (2022.01) | |

(52) U.S. Cl.
CPC ............ *G10L 19/018* (2013.01); *H03F 3/181* (2013.01); *H03G 5/165* (2013.01); *H04N 21/42203* (2013.01); *H04N 21/47217* (2013.01); *H04N 21/4852* (2013.01); *H04R 27/00* (2013.01); *G06F 3/04817* (2013.01); *G06F 21/16* (2013.01); *G06F 2221/0733* (2013.01); *H04L 12/2807* (2013.01); *H04N 21/44227* (2013.01); *H04N 21/44231* (2013.01); *H04N 21/4524* (2013.01); *H04R 2227/003* (2013.01); *H04R 2227/005* (2013.01); *H04R 2420/07* (2013.01)

(58) Field of Classification Search
CPC .. G06F 16/60; G06F 21/16; G06F 2221/0733; H04N 21/42203; H04N 21/4852; H04N 21/44231; H04N 21/44227; H04N 21/4524; H04N 21/47217; H04L 12/2807; H04R 2227/003; H04R 2227/005; H04R 27/00

See application file for complete search history.

(56) References Cited

U.S. PATENT DOCUMENTS

| | | | |
|---|---|---|---|
| 5,761,320 A | | 6/1998 | Farinelli et al. |
| 5,910,991 A | | 6/1999 | Farrar |
| 5,923,902 A | | 7/1999 | Inagaki |
| 6,032,202 A | | 2/2000 | Lea et al. |
| 6,256,554 B1 | | 7/2001 | Dilorenzo |
| 6,404,811 B1 | | 6/2002 | Cvetko et al. |
| 6,469,633 B1 | | 10/2002 | Wachter et al. |
| 6,522,886 B1 | | 2/2003 | Youngs et al. |
| 6,611,537 B1 | | 8/2003 | Edens et al. |
| 6,631,410 B1 | | 10/2003 | Kowalski et al. |
| 6,650,877 B1 | * | 11/2003 | Tarbouriech ........ G06F 16/9537 455/186.1 |
| 6,757,517 B2 | | 6/2004 | Chang |
| 6,773,344 B1 | * | 8/2004 | Gabai ...................... A63H 3/28 463/1 |
| 6,778,869 B2 | | 8/2004 | Champion |
| 7,072,477 B1 | | 7/2006 | Kincaid |
| 7,130,608 B2 | | 10/2006 | Hollstrom et al. |
| 7,130,616 B2 | | 10/2006 | Janik |
| 7,143,939 B2 | | 12/2006 | Henzerling |
| 7,158,624 B1 | * | 1/2007 | O'Toole, Jr. ........ H04M 3/4285 379/201.1 |
| 7,236,773 B2 | | 6/2007 | Thomas |
| 7,295,548 B2 | | 11/2007 | Blank et al. |
| 7,483,538 B2 | | 1/2009 | McCarty et al. |
| 7,483,540 B2 | | 1/2009 | Rabinowitz et al. |
| 7,490,044 B2 | | 2/2009 | Kulkarni |
| 7,505,823 B1 | * | 3/2009 | Bartlett ................. G10L 19/018 446/175 |
| 7,519,188 B2 | | 4/2009 | Berardi et al. |
| 7,571,014 B1 | | 8/2009 | Lambourne et al. |
| 7,630,500 B1 | | 12/2009 | Beckman et al. |
| 7,630,501 B2 | | 12/2009 | Blank et al. |
| 7,643,894 B2 | | 1/2010 | Braithwaite et al. |
| 7,657,910 B1 | | 2/2010 | McAulay et al. |
| 7,689,305 B2 | | 3/2010 | Kreifeldt et al. |
| 7,853,341 B2 | | 12/2010 | McCarty et al. |
| 7,987,294 B2 | | 7/2011 | Bryce et al. |
| 3,014,423 A1 | | 9/2011 | Thaler et al. |
| 8,045,721 B2 | | 10/2011 | Burgan et al. |
| 8,045,952 B2 | | 10/2011 | Qureshey et al. |
| 8,063,698 B2 | | 11/2011 | Howard |
| 8,103,009 B2 | | 1/2012 | McCarty et al. |
| 8,116,476 B2 | | 2/2012 | Inohara |
| 8,126,172 B2 | | 2/2012 | Horbach et al. |
| 8,139,774 B2 | | 3/2012 | Berardi et al. |
| 8,144,883 B2 | | 3/2012 | Pdersen et al. |
| 8,160,281 B2 | | 4/2012 | Kim et al. |
| 8,170,260 B2 | | 5/2012 | Reining et al. |
| 8,175,292 B2 | | 5/2012 | Aylward et al. |
| 8,175,297 B1 | | 5/2012 | Ho et al. |
| 8,194,874 B2 | | 6/2012 | Starobin et al. |
| 8,229,125 B2 | | 7/2012 | Short |
| 8,233,632 B1 | | 7/2012 | Macdonald et al. |
| 8,234,395 B2 | | 7/2012 | Millington |
| 8,238,578 B2 | | 8/2012 | Aylward |
| 8,243,961 B1 | | 8/2012 | Morrill |
| 8,265,310 B2 | | 9/2012 | Berardi et al. |
| 8,279,709 B2 | | 10/2012 | Choisel et al. |
| 8,281,001 B2 | | 10/2012 | Busam et al. |
| 8,290,185 B2 | | 10/2012 | Kim |
| 8,300,845 B2 | | 10/2012 | Zurek et al. |
| 8,306,235 B2 | | 11/2012 | Mahowald |
| 8,325,931 B2 | | 12/2012 | Howard et al. |
| 8,325,935 B2 | | 12/2012 | Rutschman |
| 8,331,585 B2 | | 12/2012 | Hagen et al. |
| 8,391,501 B2 | | 3/2013 | Khawand et al. |
| 8,401,202 B2 | | 3/2013 | Brooking |
| 8,433,076 B2 | | 4/2013 | Zurek et al. |
| 8,452,020 B2 | | 5/2013 | Gregg et al. |
| 8,463,184 B2 | | 6/2013 | Dua |
| 8,483,853 B1 | | 7/2013 | Lambourne |
| 8,494,176 B2 | | 7/2013 | Suzuki et al. |
| 8,527,876 B2 | | 9/2013 | Wood et al. |
| 8,577,045 B2 | | 11/2013 | Gibbs |
| 8,577,048 B2 | | 11/2013 | Chaikin et al. |
| 8,594,340 B2 | | 11/2013 | Takara et al. |
| 8,600,075 B2 | | 12/2013 | Lim |
| 8,620,006 B2 | | 12/2013 | Berardi et al. |
| 8,731,206 B1 | | 5/2014 | Park |
| 8,819,554 B2 | | 8/2014 | Basso et al. |
| 8,855,319 B2 | | 10/2014 | Liu et al. |
| 8,879,761 B2 | | 11/2014 | Johnson et al. |
| 8,914,559 B2 | | 12/2014 | Kalayjian et al. |
| 8,934,647 B2 | | 1/2015 | Joyce et al. |
| 8,934,655 B2 | | 1/2015 | Breen et al. |
| 8,965,546 B2 | | 2/2015 | Msser et al. |
| 8,977,974 B2 | | 3/2015 | Kraut |
| 8,984,442 B2 | | 3/2015 | Pirnack et al. |
| 8,989,406 B2 | | 3/2015 | Wong et al. |
| 9,020,153 B2 | | 4/2015 | Britt, Jr. |
| 9,137,243 B2 | | 9/2015 | Suzuki et al. |
| 9,344,802 B2 | | 5/2016 | Suzuki et al. |
| 9,401,058 B2 | | 7/2016 | De La Fuente et al. |
| 9,900,723 B1 | | 2/2018 | Choisel et al. |
| 2001/0042107 A1 | | 11/2001 | Palm |
| 2002/0022453 A1 | | 2/2002 | Balog et al. |
| 2002/0026442 A1 | | 2/2002 | Lipscomb et al. |
| 2002/0124097 A1 | | 9/2002 | Isely et al. |
| 2003/0012403 A1 | * | 1/2003 | Rhoads ................. G06F 16/489 382/100 |
| 2003/0157951 A1 | | 8/2003 | Hasty |

(56) References Cited

U.S. PATENT DOCUMENTS

| | | | |
|---|---|---|---|
| 2003/0200001 A1* | 10/2003 | Goddard | H04N 21/4392 700/94 |
| 2003/0236872 A1 | 12/2003 | Atkinson | |
| 2004/0024478 A1 | 2/2004 | Hans et al. | |
| 2004/0162062 A1* | 8/2004 | Lee | H04N 21/41407 455/414.3 |
| 2004/0169581 A1* | 9/2004 | Petrovic | G06F 7/00 340/5.2 |
| 2006/0161835 A1* | 7/2006 | Panabaker | H04N 21/4325 715/203 |
| 2006/0270395 A1* | 11/2006 | Dhawan | H04L 65/4076 455/418 |
| 2007/0142944 A1 | 6/2007 | Goldberg et al. | |
| 2007/0233759 A1* | 10/2007 | Tomlinson | G06F 16/40 708/200 |
| 2007/0297459 A1* | 12/2007 | Cucos | H04J 3/07 370/505 |
| 2008/0045140 A1* | 2/2008 | Korhonen | H04M 1/7253 455/3.06 |
| 2008/0077261 A1* | 3/2008 | Baudino | H04H 20/63 700/94 |
| 2008/0290987 A1 | 11/2008 | Li | |
| 2009/0132391 A1* | 5/2009 | Jacobs | G10L 19/018 705/26.1 |
| 2009/0138484 A1 | 5/2009 | Ramos et al. | |
| 2009/0176505 A1* | 7/2009 | Van Deventer | G06F 1/1686 455/456.1 |
| 2010/0080086 A1 | 4/2010 | Wright et al. | |
| 2010/0142735 A1 | 6/2010 | Yoon et al. | |
| 2010/0268573 A1* | 10/2010 | Jain | G06Q 30/0203 705/7.32 |
| 2010/0272270 A1 | 10/2010 | Chaikin et al. | |
| 2011/0007904 A1* | 1/2011 | Tomoda | H04S 7/301 381/17 |
| 2011/0072452 A1 | 3/2011 | Shimy et al. | |
| 2011/0170710 A1 | 7/2011 | Son | |
| 2011/0182445 A1* | 7/2011 | Atsmon | G06F 21/35 381/123 |
| 2011/0214143 A1* | 9/2011 | Rits | H04N 21/8586 725/34 |
| 2011/0224992 A1* | 9/2011 | Chaoui | H04H 60/58 704/500 |
| 2012/0029670 A1 | 2/2012 | Mont-Reynaud et al. | |
| 2012/0051558 A1 | 3/2012 | Kim et al. | |
| 2012/0072731 A1* | 3/2012 | Winograd | G09C 5/00 713/176 |
| 2012/0093320 A1* | 4/2012 | Flaks | A63F 13/44 381/17 |
| 2012/0127831 A1 | 5/2012 | Gicklhorn et al. | |
| 2012/0134282 A1* | 5/2012 | Tirronen | H04W 4/80 370/252 |
| 2012/0148075 A1 | 6/2012 | Goh et al. | |
| 2012/0214416 A1* | 8/2012 | Kent | H04W 12/50 455/41.2 |
| 2012/0216226 A1* | 8/2012 | Humphrey | H04N 21/8586 725/34 |
| 2012/0245978 A1* | 9/2012 | Jain | G06Q 30/02 705/7.34 |
| 2012/0263325 A1 | 10/2012 | Freeman et al. | |
| 2013/0006404 A1* | 1/2013 | Pitkanen | G06F 3/165 700/94 |
| 2013/0010970 A1 | 1/2013 | Hegarty et al. | |
| 2013/0028443 A1 | 1/2013 | Pance et al. | |
| 2013/0106977 A1* | 5/2013 | Chu | H04N 7/15 348/14.02 |
| 2013/0114847 A1* | 5/2013 | Petrovic | G06K 9/6206 382/100 |
| 2013/0122810 A1* | 5/2013 | Kaufman | H04W 4/21 455/41.2 |
| 2013/0202128 A1* | 8/2013 | Jain | G06Q 30/0201 381/76 |
| 2013/0202131 A1 | 8/2013 | Kemmochi et al. | |
| 2013/0227179 A1* | 8/2013 | Kalayjian | H04M 1/605 710/36 |
| 2013/0230175 A1 | 9/2013 | Bech et al. | |
| 2013/0259254 A1 | 10/2013 | Xiang et al. | |
| 2013/0265857 A1* | 10/2013 | Foulds | H04W 4/21 367/199 |
| 2013/0279706 A1 | 10/2013 | Marti et al. | |
| 2013/0315038 A1* | 11/2013 | Ferren | G06F 3/0346 367/197 |
| 2013/0325888 A1 | 12/2013 | Oneppo et al. | |
| 2014/0007154 A1* | 1/2014 | Seibold | H04H 60/46 725/25 |
| 2014/0016784 A1 | 1/2014 | Sen et al. | |
| 2014/0016786 A1 | 1/2014 | Sen | |
| 2014/0016802 A1 | 1/2014 | Sen | |
| 2014/0023196 A1 | 1/2014 | Xiang et al. | |
| 2014/0037097 A1 | 2/2014 | Labosco | |
| 2014/0064501 A1 | 3/2014 | Olsen et al. | |
| 2014/0079242 A1 | 3/2014 | Nguyen et al. | |
| 2014/0112481 A1 | 4/2014 | Li et al. | |
| 2014/0161265 A1 | 6/2014 | Chaikin et al. | |
| 2014/0192986 A1 | 7/2014 | Lee et al. | |
| 2014/0219456 A1 | 8/2014 | Morrell et al. | |
| 2014/0219483 A1 | 8/2014 | Hong | |
| 2014/0226823 A1 | 8/2014 | Sen et al. | |
| 2014/0242913 A1 | 8/2014 | Pang | |
| 2014/0267148 A1 | 9/2014 | Luna et al. | |
| 2014/0270202 A1 | 9/2014 | Ivanov et al. | |
| 2014/0273859 A1 | 9/2014 | Luna et al. | |
| 2014/0279889 A1 | 9/2014 | Luna et al. | |
| 2014/0285313 A1 | 9/2014 | Luna et al. | |
| 2014/0286496 A1 | 9/2014 | Luna et al. | |
| 2014/0294200 A1 | 10/2014 | Baumgarte et al. | |
| 2014/0344689 A1 | 11/2014 | Scott et al. | |
| 2014/0355768 A1 | 12/2014 | Sen et al. | |
| 2014/0355794 A1 | 12/2014 | Morrell et al. | |
| 2015/0032844 A1 | 1/2015 | Tarr et al. | |
| 2015/0043736 A1 | 2/2015 | Olsen et al. | |
| 2015/0063610 A1 | 3/2015 | Mossner | |
| 2015/0124975 A1 | 5/2015 | Pontoppidan | |
| 2015/0146886 A1 | 5/2015 | Baumgarte | |
| 2015/0201274 A1 | 7/2015 | Ellner et al. | |
| 2015/0222563 A1 | 8/2015 | Burns et al. | |
| 2015/0281866 A1 | 10/2015 | Williams et al. | |
| 2016/0197648 A1* | 7/2016 | Paulson | H04W 74/0866 455/41.1 |
| 2017/0180350 A1* | 6/2017 | Kaufman | H04L 63/18 |
| 2018/0084367 A1 | 3/2018 | Greff et al. | |
| 2018/0091898 A1 | 3/2018 | Yoon et al. | |
| 2018/0130085 A1* | 5/2018 | Anand | G06Q 30/0226 |
| 2018/0132298 A1 | 5/2018 | Birnam et al. | |
| 2018/0165055 A1 | 6/2018 | Yu et al. | |
| 2018/0167981 A1 | 6/2018 | Jonna et al. | |
| 2018/0367944 A1 | 12/2018 | Heo et al. | |
| 2019/0019178 A1* | 1/2019 | Etchegoyen | G06Q 20/40145 |
| 2019/0081507 A1 | 3/2019 | Ide | |
| 2019/0295563 A1 | 9/2019 | Kamdar et al. | |

FOREIGN PATENT DOCUMENTS

| | | |
|---|---|---|
| EP | 1389853 A1 | 2/2004 |
| EP | 2043381 A2 | 4/2009 |
| EP | 2161950 A2 | 3/2010 |
| EP | 1825713 B1 | 10/2012 |
| EP | 2591617 B1 | 6/2014 |
| EP | 2860992 A1 | 4/2015 |
| WO | 200153994 | 7/2001 |
| WO | 2003093950 A2 | 11/2003 |
| WO | 2015024881 A1 | 2/2015 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth "Specification of the Bluetooth System: The ad hoc SCATTERNET for affordable and highly functional wireless connectivity," Core, Version 1.0 A, Jul. 26, 1999, 1068 pages.

(56) References Cited

OTHER PUBLICATIONS

Bluetooth "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Jun. 8, 2017, issued in connection with U.S. Appl. No. 14/558,944, filed Dec. 3, 2014, 12 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Dec. 1, 2020, issued in connection with U.S. Appl. No. 17/023,344, filed Sep. 16, 2020, 20 pages.
Non-Final Office Action dated Sep. 11, 2017, issued in connection with U.S. Appl. No. 15/298,894, filed Oct. 20, 2016, 11 pages.
Non-Final Office Action dated Dec. 13, 2016, issued in connection with U.S. Appl. No. 14/558,944, filed Dec. 3, 2014, 11 pages.
Non-Final Office Action dated Sep. 13, 2019, issued in connection with U.S. Appl. No. 16/102,689, filed Aug. 13, 2018, 17 pages.
Non-Final Office Action dated Nov. 15, 2017, issued in connection with U.S. Appl. No. 14/558,944, filed Dec. 3, 2014, 11 pages.
Non-Final Office Action dated Jun. 23, 2014, issued in connection with U.S. Appl. No. 13/568,993, filed Aug. 7, 2012, 6 pages.
Non-Final Office Action dated Sep. 26, 2014, issued in connection with U.S. Appl. No. 13/568,993, filed Aug. 7, 2012, 7 pages.
Notice of Allowance dated Aug. 5, 2016, issued in connection with U.S. Appl. No. 14/558,944, filed Dec. 3, 2014, 7 pages.
Notice of Allowance dated Nov. 21, 2014, issued in connection with U.S. Appl. No. 13/568,993, filed Aug. 7, 2012, 7 pages.
Notice of Allowance dated Sep. 23, 2020, issued in connection with U.S. Appl. No. 16/102,689, filed Aug. 13, 2018, 6 pages.
Notice of Allowance dated Jul. 28, 2016, issued in connection with U.S. Appl. No. 14/679,815, filed Apr. 6, 2015, 7 pages.
Notice of Allowance dated Apr. 30, 2020, issued in connection with U.S. Appl. No. 16/102,689, filed Aug. 13, 2018, 6 pages.
Notice of Allowance dated Oct. 30, 2019, issued in connection with U.S. Appl. No. 16/131,392, filed Sep. 14, 2018, 9 pages.
Notice of Allowance dated Apr. 4, 2018, issued in connection with U.S. Appl. No. 14/558,944, filed Dec. 3, 2014, 5 pages.
Notice of Allowance dated Feb. 5, 2018, issued in connection with U.S. Appl. No. 15/298,894, filed Oct. 20, 2016, 5 pages.
Notice of Withdrawal from Allowance dated Oct. 18, 2016, issued in connection with U.S. Appl. No. 14/558,944, filed Dec. 3, 2014, 2 pages.
Palm, Inc., "Handbook for the Palm VII Handheld," May 2000, 311 pages.
Preinterview First Office Action dated Jun. 3, 2016, issued in connection with U.S. Appl. No. 14/558,944, filed Dec. 3, 2014, 4 pages.
Preinterview First Office Action dated Jun. 29, 2016, issued in connection with U.S. Appl. No. 14/679,815, filed Apr. 6, 2015, 4 pages.
Presentations at WinHEC 2000, May 2000, 138 pages.
Supplemental Notice of Allowability dated Nov. 9, 2016, issued in connection with U.S. Appl. No. 14/679,815, filed Apr. 6, 2015, 5 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

ACOUSTIC SIGNATURES IN A PLAYBACK SYSTEM

CROSS-REFERENCE TO RELATED APPLICATIONS

This application is a continuation of U.S. application Ser. No. 16/102,689, filed on Mar. 13, 2018, which is a continuation of U.S. application Ser. No. 14/558,944, filed on Dec. 3, 2014 and now issued as U.S. Pat. No. 10,051,397, which is a continuation of U.S. application Ser. No. 13/568,993, filed on Aug. 7, 2012 and now issued as U.S. Pat. No. 8,930,005, each of which is hereby incorporated by reference in its entirety.

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

Figure 1:
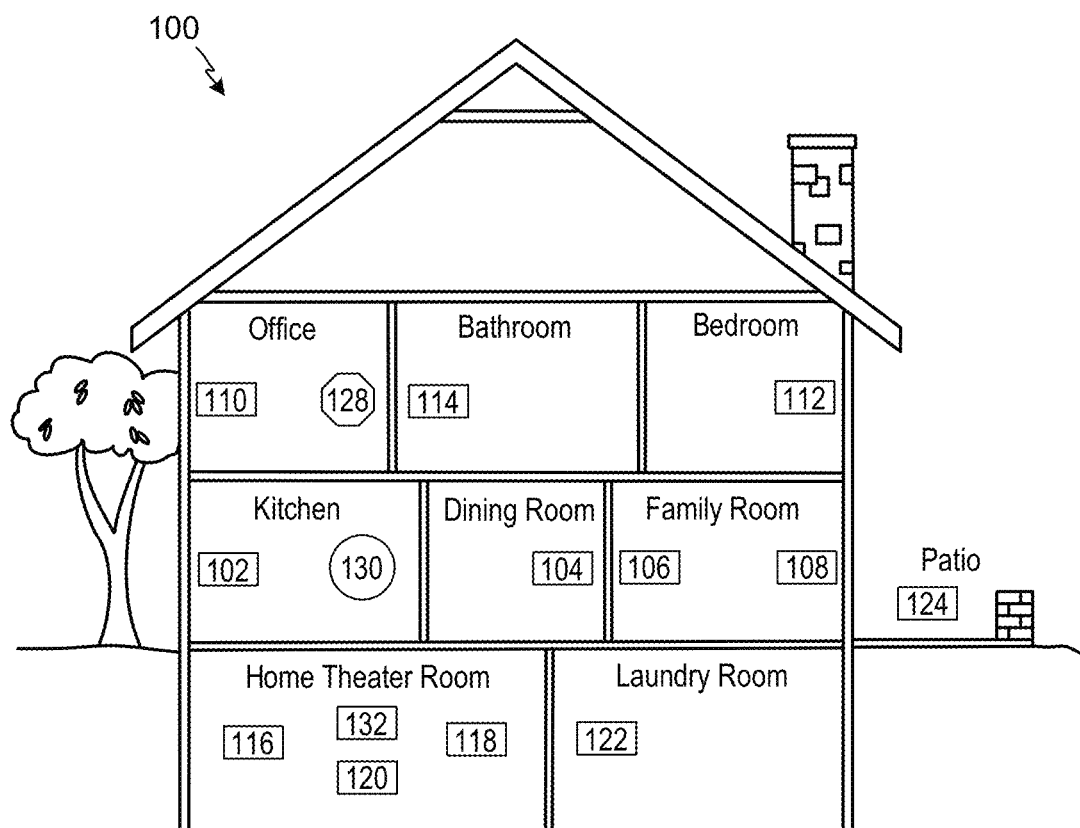
FIG. 1 shows an illustration of an example system in which embodiments disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

Listening to audio content out loud can be a social activity that involves family, friends, or both. Audio content may include, for instance, music, talk radio, books, audio from television, and other audible material. For example, in a household, people may play music out loud at parties and other social gatherings. In such an environment, people may wish to play the music in one listening zone or multiple listening zones simultaneously, such that the music in each listening zone may be synchronized, without audible echoes or glitches. Such an experience may be further enriched when people, for example, browse audio sources, add a music track to a playback queue, learn more about a music track (such as track title or track artists), or view what music track is next in the playback queue.

Listening to audio content out loud can also be an individual experience. For example, an individual may play music out loud for themselves in the morning before work, in the evening during dinner, or at other times throughout the day at home, work, or on the road. In a household or shared environment, individuals may want to play different music in different listening zones at the same time. For these individual experiences, the individual may choose to either use headphones or limit the out loud playback of audio content to a single zone or area.

Time-to-music is an important element of the audio experience and time-to-music can be reduced, for example, when a user can select and play music without having to navigate several menu items or display screens. Favorites, playlists, and personalized streaming services that tailor to a user's preference (e.g., Pandora™) can minimize search time to provide content quickly. However, content selection is only one aspect of time-to-music, and other elements such as player or room selection, zone grouping, and so on contribute to increased time-to-music.

Example systems, methods, apparatus, and articles of manufacture disclosed and described herein provide for an acoustic signature emitted from a playback device. In some embodiments, the acoustic signature identifies the playback device and/or characteristics about the playback device. In some embodiments, the acoustic signature identifies a listening zone or a group of listening zones. In some embodiments, the acoustic signature is dynamic and changes over time and/or changes responsive to a change in system configuration. According to some embodiments, the acoustic signature can be used to decrease a user's time-to-music, examples of which are described herein.

Example systems, methods, apparatus, and articles of manufacture disclosed and described herein provide for automatic recognition using a microphone on a controller. For example, when a user enters a zone or listening area with a controller for the playback system, the controller automatically recognizes the acoustic signature emitted from the playback device. In some embodiments, the controller is an application on a mobile device such as a smart phone (e.g., IPHONE™, ANDROID™ phone, and so on) or tablet (e.g., IPAD™, ANDROID™ tablet, and so on). In other embodiments, the controller is a portable device dedicated to control the playback system (e.g., SONOS™ Controller, etc.). In some embodiments, the user interface (UI) on the controller is responsively updated after an acoustic signature is detected. For example, an indication of a zone may be displayed on a display screen and/or playback controls may be automatically assigned to the zone. In another example, an indication of a playback device may be displayed on a display screen and/or device controls may be automatically assigned to the device. According to an example, the acoustic signature can be used to decrease a user's time-to-music by, for example, triggering an automatic modification of the UI on the controller to reflect a more likely scenario for media playback.

Example systems, methods, apparatus, and articles of manufacture disclosed and described herein provide for automatic recognition using an acoustic signature emitted from a playback device. In some embodiments, the acoustic signature is emitted from the playback device indirectly through one or more external speakers that are connected to the playback device. In some embodiments, the acoustic signature is emitted from the playback device directly when the playback device includes speakers. In some embodiments, the acoustic signature is emitted from the playback device when audio is playing from the playback device. In some embodiments, the acoustic signature is emitted from the playback device when no media-based audio is playing from the playback device. In some embodiments, the acoustic signature that is emitted from the playback device is imperceptible (or substantially imperceptible) by a user. For example, the acoustic signature could be shaped such that the frequencies of the signature are outside, or generally outside, the listening response of the human ear. According to another example, the acoustic signature can be used to decrease a user's time-to-music by, for example, providing automatic recognition of the playback device via the acoustic signature.

Many other embodiments and advantages are provided and described herein.

II. An Example Operating Environment

Referring now to the drawings, in which like numerals can refer to like parts throughout the figures, FIG. 1 shows an example system 100 in which one or more embodiments disclosed herein can be practiced or implemented.

By way of illustration, system 100 represents a home presently configured with multiple zones, though the home could have been configured with only one zone. Each zone in the home, for example, may represent a different room or space, such as an office, bathroom, bedroom, kitchen, dining room, family room, home theater room, utility or laundry room, and patio. A single zone might also include multiple rooms if so configured. One or more of zone players 102-124 are shown in each respective zone of the home. A zone player 102-124, also referred to as a playback device, multimedia unit, speaker, player, and so on, provides audio, video, and/or audiovisual output. Controller 130 provides control to system 100. Controller 130 may be fixed to a zone, or alternatively, mobile such that it can be moved about the zones. System 100 may also include more than one controller 130. System 100 illustrates an example whole house audio system, though it is understood that the technology described herein is not limited to its particular place of application or to an expansive system like a whole house audio system 100 of FIG. 1.

A. Example Zone Players

Figure 2A:
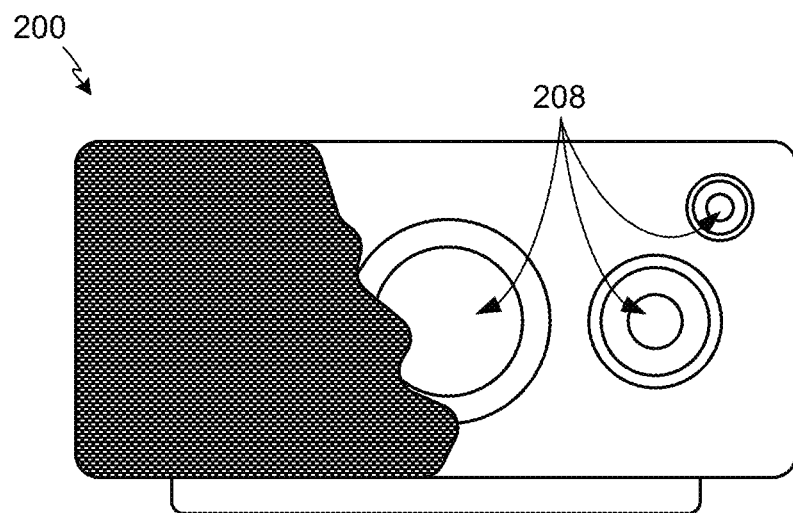
FIG. 2A shows an illustration of an example zone player having a built-in amplifier and speakers.
Figure 2B:
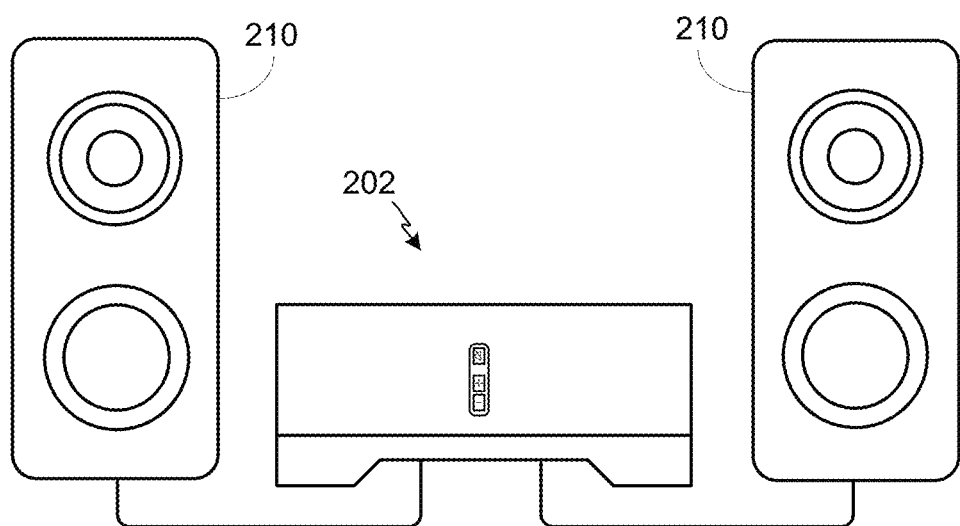
FIG. 2B shows an illustration of an example zone player having a built-in amplifier and connected to external speakers.
Figure 2C:
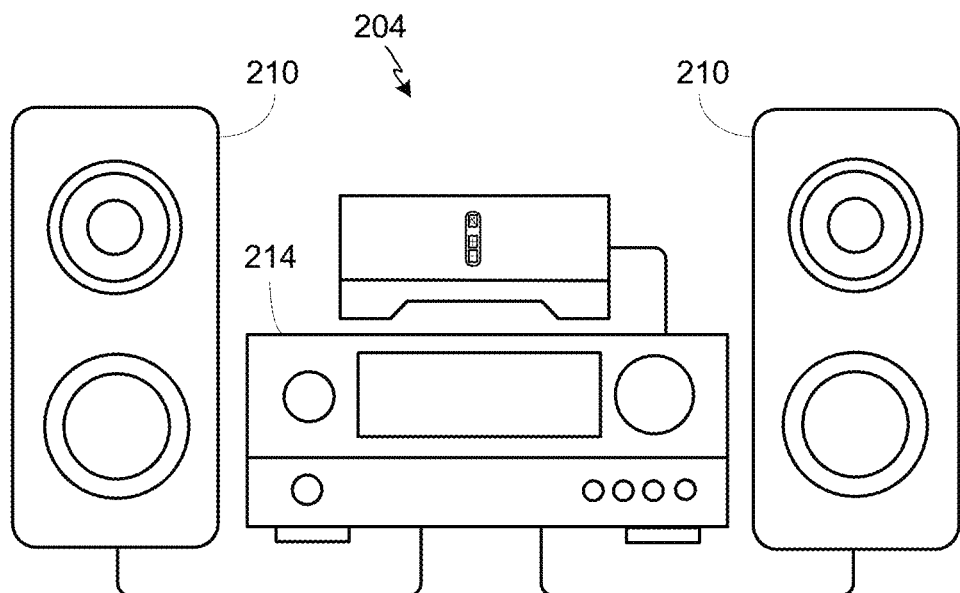
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128, the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

B. Example Controllers

Figure 3:
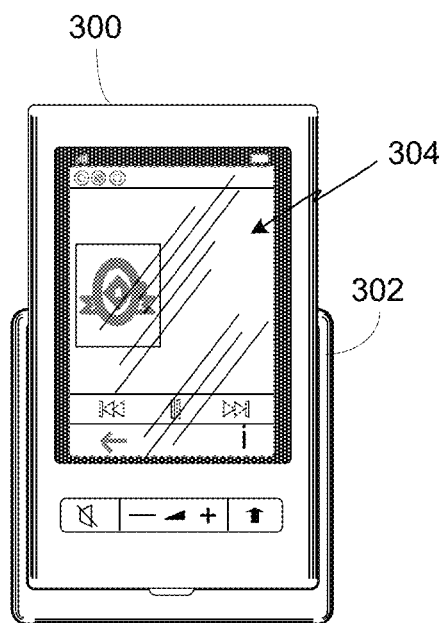
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by SONOS, Inc. of Santa Barbara, Calif. include a "Controller 200," "SONOS® CONTROL," "SONOS® Controller for iPhone," "SONOS® Controller for IPAD™," "SONOS® Controller for ANDROID™," "SONOS® Controller for MAC™ or PC."

C. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

D. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

E. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Zone Players

Figure 4:
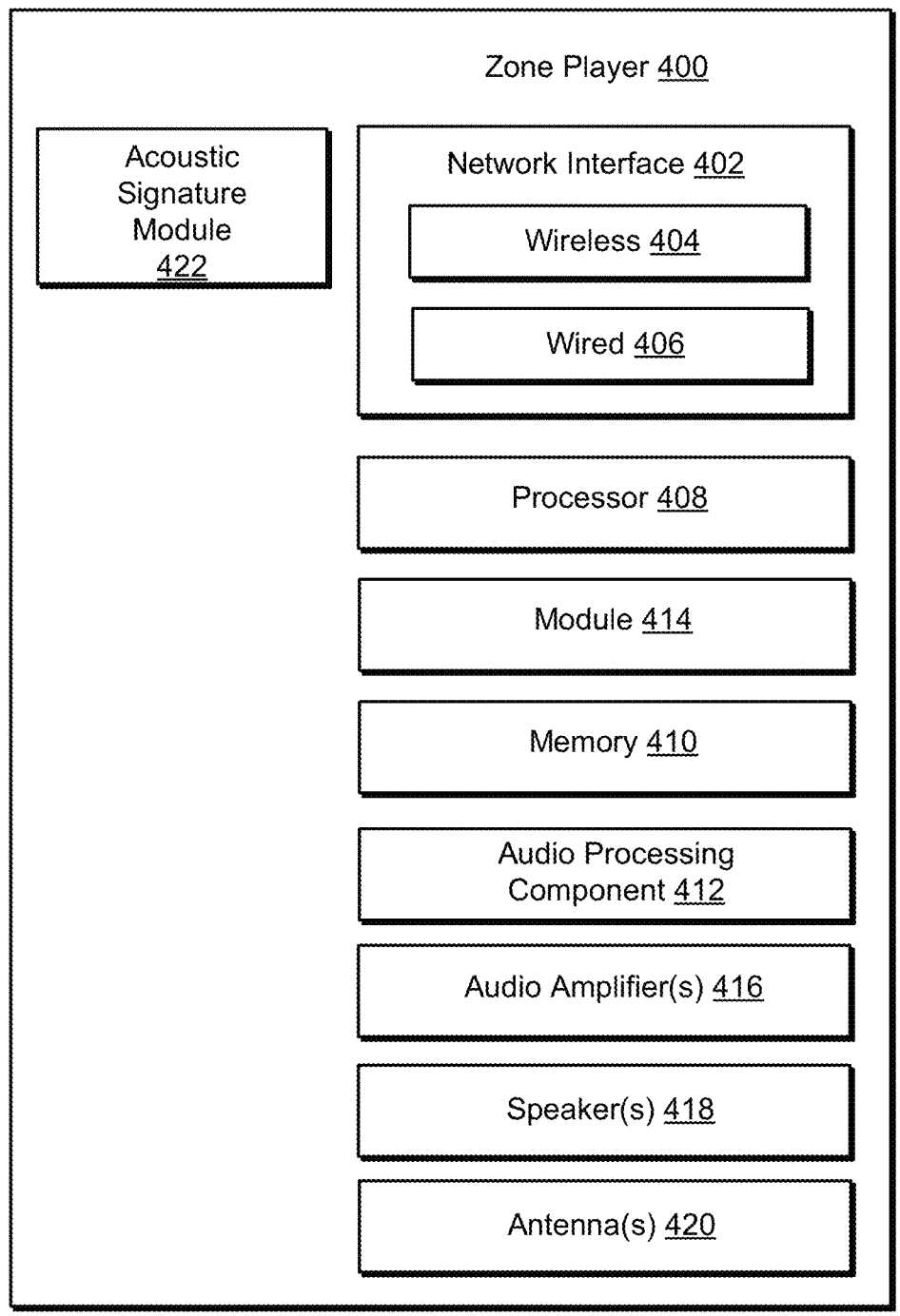
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, a speaker unit 418 coupled to the audio amplifier 416, and an acoustic signature module. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

In some embodiments, the acoustic signature module 422 transmits an acoustic signature (e.g., identification information) via the audio processing component 412 as audio signals. In one embodiment, the information (as an audio signal) is provided to the audio amplifier 416 for playback through speakers 418. In another embodiment, the information (as an audio signal) is provided to the audio amplifier 416 for playback through external speakers. In yet another embodiment, the information (as an audio signal) is provided to an external amplifier for playback.

Figure 5:
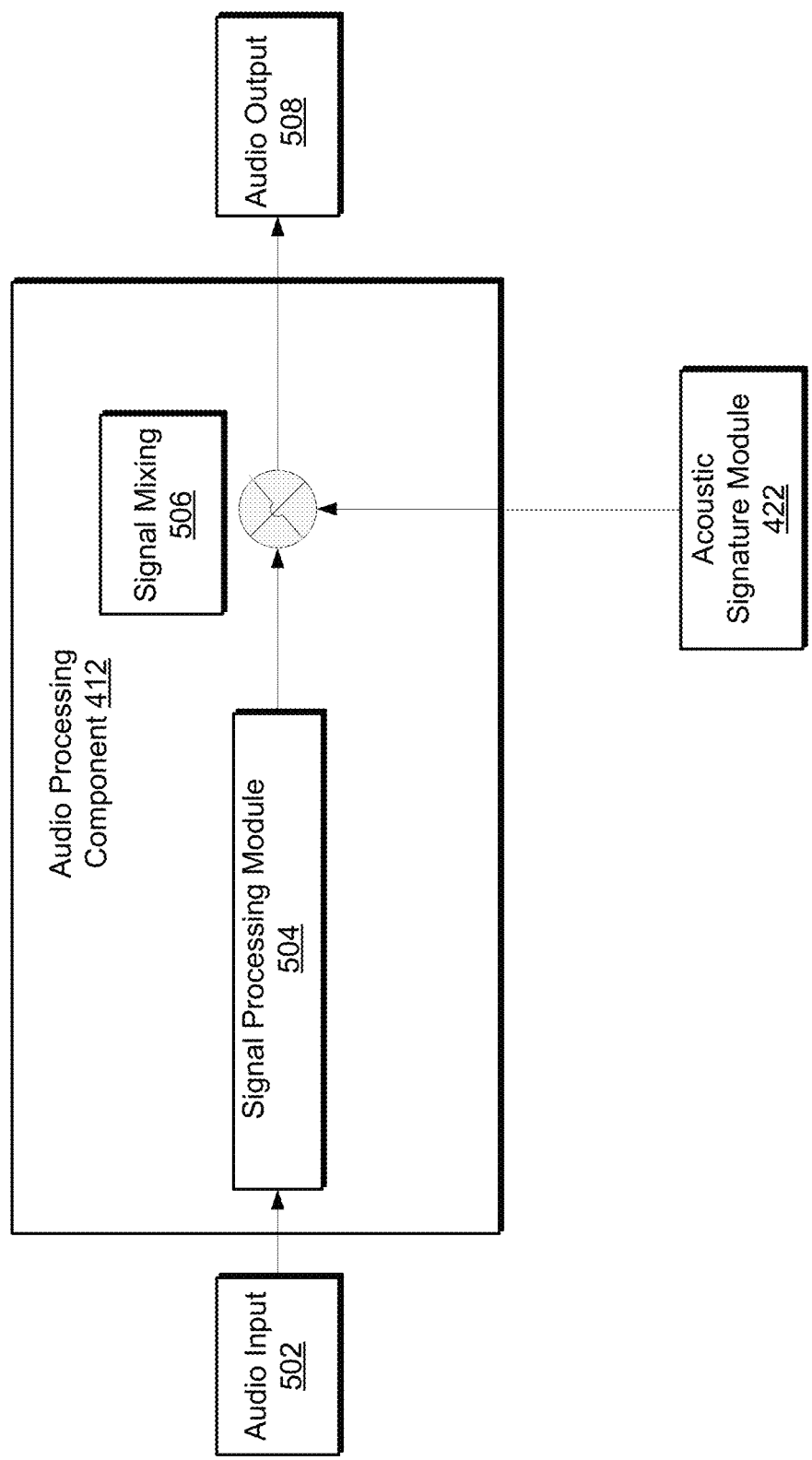
FIG. 5 shows an internal function block diagram of an example audio processing component.

FIG. 5 shows an example where the signature module 422 feeds the acoustic signature into the audio module 412 at a point after signal processing takes place in the audio module 412. Mixing the acoustic signature with the audio after the signal processing is done avoids equalization being applied to the acoustic signature. Audio intended for playback by the device enters the audio processing component in block 502. For example, the audio can come from a network interface or from a line-in connection as described above. In block 504, a signal processing module performs equalization or other signal processing on the audio input. For example, if a PLAY:3 device is paired with a SUB device, then the low-frequencies of the audio input signal can be filtered out using a low pass filter (LPF) in the signal processing module 504. In block 506, the audio is mixed with the acoustic signature. Note that, for example, if there is currently no audio for playback when the acoustic signature is mixed, then the output of block 506 is just the acoustic signature. In block 508, the audio output exits the audio module 412. For example, the audio plus acoustic signature can be played by internal or external speakers, or it can be passed to another device for playback.

A commercial example, presently known as the PLAY:5, is a zone player with a built-in amplifier and speakers that is capable of retrieving audio directly from the source, such as on the Internet or on the local network, for example. In particular, the PLAY:5 is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, but from different channels of audio. Audio from Internet radio stations, online music and video services, downloaded music, analog audio inputs, television, DVD, and so on, can be played from the PLAY:5.

IV. Controller

Figure 6:
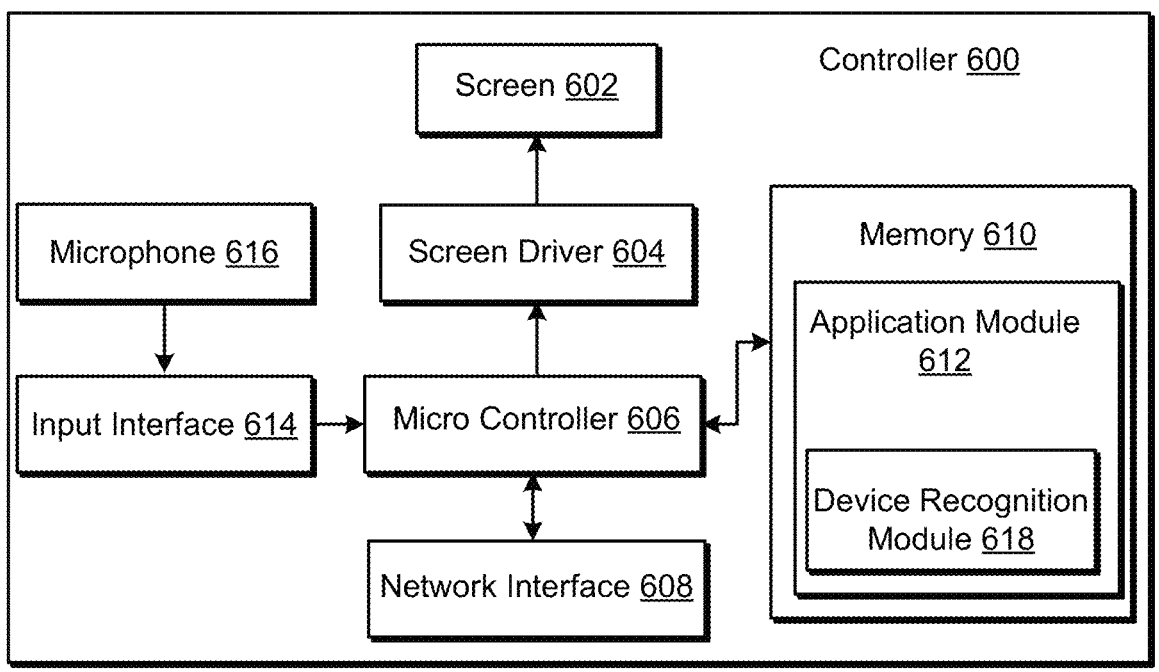
FIG. 6 shows an internal functional block diagram of an example controller.

Referring now to FIG. 6, there is shown an example block diagram for controller 600, which can correspond to the controlling device 130 in FIG. 1. Controller 600 can be used to facilitate the control of multi-media applications, automation and others in a system. In particular, the controller 600 may be configured to facilitate a selection of a plurality of audio sources available on the network and enable control of one or more zone players (e.g., the zone players 102-124 in FIG. 1) through a wireless or wired network interface 608. According to one embodiment, the wireless communications is based on an industry standard (e.g., infrared, radio, wireless standards including IEEE 802.11a, 802.11b, 802.11g, 802.11n, or 802.15, and so on). Further, when a particular audio is being accessed via the controller 600 or being played via a zone player, a picture (e.g., album art) or any other data, associated with the audio and/or audio source can be transmitted from a zone player or other electronic device to controller 600 for display.

Controller 600 is provided with a screen 602 and an input interface 614 that allows a user to interact with the controller 600, for example, to navigate a playlist of many multimedia items and to control operations of one or more zone players. The input interface 614 may be coupled to a microphone 616 for capturing audio signals, such as audio content, and acoustic signature, or voice commands as control inputs. The screen 602 on the controller 600 can be an LCD screen, for example. The screen 600 communicates with and is commanded by a screen driver 604 that is controlled by a microcontroller (e.g., a processor) 606. The memory 610 can be loaded with one or more application modules 612 that can be executed by the microcontroller 606 with or without a user input via the user interface 614 to achieve certain tasks. In some embodiments, an application module 612 is configured to facilitate grouping a number of selected zone players into a zone group and synchronizing the zone players for audio play back. In some embodiments, an application module 612 is configured to control the audio sounds (e.g., volume) of the zone players in a zone group. In operation, when the microcontroller 606 executes one or more of the application modules 612, the screen driver 604 generates control signals to drive the screen 602 to display an application specific user interface accordingly. In some embodiments, a room recognition module 618 is a type of application module 612 that is configured to identify a room location. In operation, when the microcontroller 606 executes the room recognition module 618, and the output from the microphone module is provided to the room recognition module to identify a room.

The controller 600 includes a network interface 608 that facilitates wired or wireless communication with a zone player. In some embodiments, the commands such as volume control and audio playback synchronization are sent via the network interface 608. In some embodiments, a saved zone group configuration is transmitted between a zone player and a controller via the network interface 608. The controller 600 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE®, IPAD® or any other smart phone or network-enabled device (e.g., a networked computer such as a PC or Mac®) can also be used as a controller to interact or control zone players in a particular environment. In some embodiments, a software application or upgrade can be downloaded onto a network-enabled device to perform the functions described herein.

In certain embodiments, a user can create a zone group including at least two zone players from the controller 600. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 600, the signals or data of increasing the audio volume for the group are sent to one of the zone players and causes other zone players in the group to be increased together in volume.

A user via the controller 600 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

VII. Room Recognition Using Acoustic Signatures

In an example system such as the one shown in FIG. 1, where a SONOS system, for example, including multiple playback devices and one or more controllers, is connected together in a local area network (LAN), the ability to identify a playback device or a zone, or both the playback device and the zone, based on detecting an acoustic signature transmitted from a playback device may be valuable. A playback device in the example system may transmit the acoustic signature such that a microphone on a controller (or, similarly, a microphone associated with the controller) can detect the signature without the user hearing the signature. It is understood, however, that the signature may be heard by a particularly sensitive user depending on the type of signature used. It is further understood, that the signature may be configured to be within the boundaries of human hearing and therefore heard by the user according to other embodiments. Further, it may be valuable to automatically modify the UI on a controller based on the identification of the playback device or zone.

A. Players and Grouped Players

In the example system, one or more users can listen to audio using one or more playback devices, also referred to as players or zone players. In some embodiments, the example system includes the capability to group multiple players together to play audio in a synchronized fashion such that all of the players play back audio from an (e.g., identical) audio source or a list of audio sources in a synchronized manner such that no (or substantially no) audible delays or can be heard. Examples of grouped players include a zone group (when two or more zones are grouped), zone scenes (when a zone or zone group is formed based upon a trigger), bonded zone (often further distinguished as a zone having two or more players, a "paired player," or "consolidated player"), and so on. In certain embodiments, players can be grouped and ungrouped dynamically, preferably through a control interface, such as a wireless controller. It is understood, however, that a control interface may not be required to group and ungroup players. Grouped players can be further grouped with other players and/or zone groups to create yet another (i.e., nested) group of players.

In some embodiments, when a group of players is created or when a player is added to a zone group, such as by user command(s) input through a controller, the player(s) of the grouped zone can each store an updated state variable that indicates the players that are included in the grouped zone. In some embodiments, a player knows it is in a zone group based on the state variable stored in memory at the player, for example. In some embodiments, the controller(s) in the system identify a player is in a grouped zone by querying a player in the grouped zone for the state variable. The controllers may use this information to display on a display screen that a player is grouped in a zone. In other embodiments, the state variable is stored at a master player, in the controller, or some other accessible location.

In the example system, users can listen to audio in one or more zones (also referred to as listening areas or rooms), and users can move between zones to experience audio throughout the home. In some embodiments, a controller can be used to control any zone or zone group in the household. Each zone can be assigned a user-readable "room name," (e.g., living room) and each player can be uniquely identified within the system. If a zone group is formed and a "room name" is assigned to the group, then each player of the zone group is associated with the "room name." Therefore, it is possible for the system to identify a zone by identifying a player in that zone.

B. Acoustic Signature

In some embodiments, an acoustic signature is an audio signal that is transmitted (or played) from a playback device that can be used to identify the playback device or the zone or both where audio is played. The acoustic signature may be played using speakers associated with a player normally intended for audio playback, speakers dedicated to providing an acoustic signature, or both kinds of speakers.

In some embodiments an acoustic signature is used to identify a playback device in a household. In one example embodiment, each playback device in a household has a unique acoustic signature that identifies the player. For example, a playback device can transmit the same acoustic signature if it is acting as a stand-alone player or if it is grouped with other players. In some embodiments, the acoustic signature may include additional information about the playback device. For example, the acoustic signature may include characteristics about the playback device such as the model number or current configuration (e.g., the positioning of the playback device, a specification of the playback device, the grouping of the playback device, and so on). In some embodiments, the acoustic signature is dynamic and may change. For example, the acoustic signature may change if the configuration of the playback device changes.

In some embodiments an acoustic signature is used to identify a zone or zone group. In one example embodiment, each zone or zone group in a household has a unique acoustic signature. For example, with reference to FIG. 1, the two playback devices 106 and 108 that are associated with the "Family Room" zone may play the same acoustic signature identifying the "Family Room." In this example, if the "Family Room" zone was subsequently linked together with the "Kitchen" zone to form a zone group, then the playback devices 106, 108, and 102 may play the same acoustic signature identifying the new zone group. In one example embodiment, players playing the same acoustic signature do so in synchrony. In another example embodiment, the acoustic signature is not played in synchrony.

In another embodiment, a subset of playback devices that are grouped together play the acoustic signature for the zone group. For example, with reference to the "Home Theater Room" of FIG. 1, playback device 132 may play an acoustic signature identifying the "Home Theater Room" zone, while the remaining players 116, 118, and 120 do not play an acoustic signature. The subset of players selected to play the acoustic signature may be based on the capabilities of the players (e.g., acoustic capabilities, processing capabilities, etc.) or some other criteria (e.g., random selection, etc.). In some embodiments, the playback device selected to play the acoustic signature is transitioned from one device to another.

In some embodiments, an acoustic signature includes identification information for a playback device and a zone. For example, with reference to the "Family Room" zone in FIG. 1, playback device 106 may transmit an acoustic signature that identifies the playback device itself as well as the "Family Room" zone. In other embodiments, a single playback device may transmit multiple acoustic signatures. For example, playback device 106 may transmit two acoustic signatures: one acoustic signature identifying the playback device itself, and a second acoustic signature identifying the "Family Room" zone.

Figure 7:
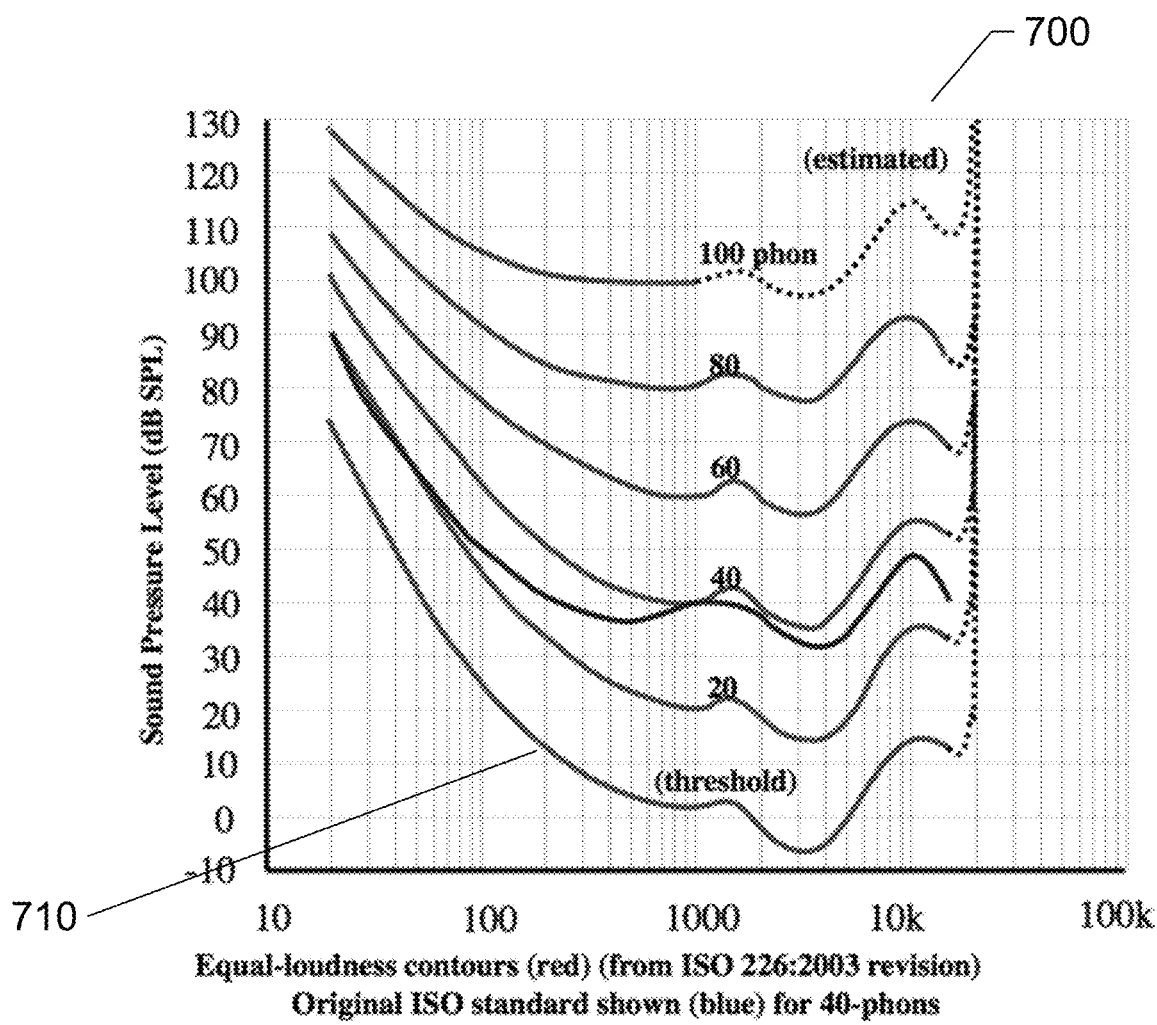
FIG. 7 shows an example graph of equal-loudness contours.

In one example embodiment, an acoustic signature is designed such that it can be detected by a microphone (e.g., on a controller), but cannot be heard by a user. For example, the acoustic signature could be shaped such that the frequencies of the signature are outside, or generally outside, the listening response of the human ear. In FIG. 7, an example graph 700 shows both the equal-loudness contours from ISO 226:2003 and the original ISO standard. These contours show a sound pressure (dBSPL) as a function of frequency for which a listener perceives a constant loudness when presented with pure tones. The contours were developed experimentally using real listeners. Although the contours may not be absolute thresholds for all humans, the contours are considered a benchmark for the audible range of the human ear. Specifically, the bottom contour 710 is considered to be the absolute threshold of hearing. As can be seen by these contours, the human auditory system is generally sensitive to frequencies from around 20 Hz to 20 kHz. Furthermore, these contours show listening response of the human ear depends on the combination of sound pressure and frequency. Looking at the bottom contour 710, it can be seen that the human auditory system is not sensitive to tones, for example, in the 20 Hz-50 Hz range at power levels less than 40 dBSPL.

In one example embodiment, the acoustic signature can be transmitted or played using low frequency signals that are difficult to hear by people at low volumes and are relatively omnidirectional, yet are still detectable by a microphone. In one example, the acoustic signature is played using signals (or tones) in the 20 Hz-40 Hz frequency range at power levels around 40 dBA; as described above, these tones are generally outside the listening response of the human ear yet still detectable by a microphone.

In one embodiment, the acoustic signature includes identification information that is modulated about a carrier frequency. For example, the acoustic signature may carry identification information via an amplitude modulated (AM) signal. In another embodiment, the acoustic signature may carry identification information via a frequency modulated (FM) signal. Other modulation schemes exist.

In one example embodiment, the acoustic signature may be a tone or signal centered on a frequency. In one example, the frequency of the tone is used to identify the playback device. For example, a 25 Hz tone may be used to identify one playback device, and a 30 Hz tone may be used to identify another playback device. In another example, the same frequency is used for all playback devices and each playback device is identified using modulation technique as mentioned above. If each tone is transmitted using the same (or substantially the same) output level, then power detection can be used on a controller, for example, to select the acoustic signature that has the greatest received power.

In some embodiments, an acoustic signature may be transmitted from a playback device while music is playing through the playback device. In one example embodiment, the acoustic signature is mixed with the audio for playback after signal processing has been applied to the audio for playback as shown in FIG. 5. In another example embodiment, the acoustic signature is played using a speaker intended for the acoustic signature. In some embodiments, an acoustic signature may be transmitted from a playback device when music is not playing through the playback device.

In certain embodiments, an acoustic signature may be transmitted on a regular basis, based on a trigger or an event, or some combination of the two. In some embodiments, an acoustic signature is transmitted periodically. For example, the acoustic signature may be transmitted every two seconds. In some embodiments an acoustic signature may be transmitted based on a trigger or an event. For example, a playback device may transmit an acoustic signature when the system detects that a controller is being used. The detection of a controller being used can occur, for example, by the system receiving messages from a controller. In one example, when a controller is used, it first exchanges messages with the system to get state information and/or identify itself with the system before enabling the user to control the system. The system can use this exchange to detect that a controller is being used. In another example, the acoustic signature may be transmitted responsive to a request made by the controller. In yet another example, a playback device may transmit an acoustic signature based on a time-triggered event. For example, the system may profile user activity and use the user profile to trigger the transmission of the acoustic signature. For example, if the user profile indicates that a user does not use the controller between the hours of 2 am and 6 am, the system may transmit the acoustic profile starting at approximately 6 am.

C. Auto Recognition

In an example system, an acoustic signature can be automatically detected by a controller (e.g., the controller 600) when the controller is in the vicinity of a playback device. In some embodiments, a microphone is used on a controller (e.g., the microphone 616 on controller 600) to detect the acoustic signature. In certain embodiments, a device recognition module (e.g., device recognition module 618 on the controller 600) identifies a playback device or zone based on the detection of an acoustic signature.

In some embodiments, the image displayed on a screen of a controller (e.g., screen 602 on controller 600) is determined from the playback device or zone identified by the device recognition module 618. For example, when controller application is started or awoken from a dormant state (e.g., when the SONOS™ Controller application is launched on an IPHONE™, IPAD™, or ANDROID™ device), the default home screen can be the zone that is identified by the device recognition module 618 on the controller 600.

In some embodiments, the ability to automatically detect the acoustic signature (and the transmission of the acoustic signature itself) can be enabled or disabled by configuration. In one embodiment, a user using a user interface on a controller can enable or disable "Auto Recognition" for the system. In one example, when "Auto Recognition" is enabled for the system, all players in the system emit acoustic signatures. In another example, when "Auto Recognition" is enabled for the system, only a subset of players emits acoustic signatures. In another embodiment, a user using a user interface on a controller can enable or disable "Auto Recognition" for a particular controller. In certain embodiments, the configuration of "Auto Recognition" on a controller may be disabled even if "Auto Recognition" is enabled for the system. For example, a user may want to disable/enable "Auto Recognition" on a portable controller to preserve the battery life.

D. Example Auto Recognition Method

Figure 8A:
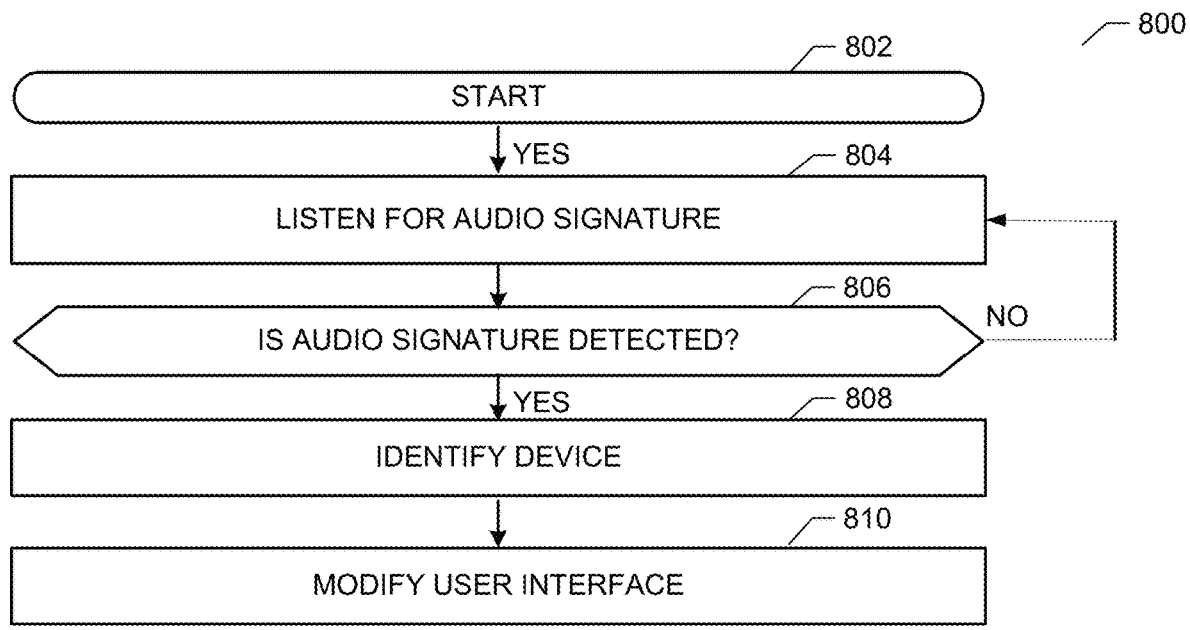
FIG. 8a illustrates a flow diagram of a first example method to facilitate automatic room recognition with acoustic signatures.

FIG. 8a illustrates a flow diagram of an example method 800 to facilitate automatic recognition of a playback device using an acoustic signature. At block 804, a controller, such as controller 600 (e.g., a dedicated hardware controller or a controller application running on a smartphone, tablet computer, PC, MAC™, and so on), listens for an acoustic signature. For example, the controller can enable the microphone 616 to begin capturing audio and the device recognition module 618 to identify the playback device. Signal processing can be used to determine if an acoustic signature is detected in block 806. For example, audio captured from the microphone 616 can be passed through the input interface 614 to the micro controller 606 where demodulation and detection algorithms can determine if an acoustic signature is present.

If an acoustic signature is detected, then the playback device is identified in block 808. The device recognition module 618 of the controller, for example, can be used to identify the device.

In the event that multiple acoustic signatures are detected on a controller, for example, algorithms can be used to select a single acoustic signature. For example, the signal power levels can be compared and the acoustic signature with the highest power level can be selected.

Once the playback device is identified, then the UI on the controller can be modified to indicate the device has been identified in block 810.

Figure 8B:
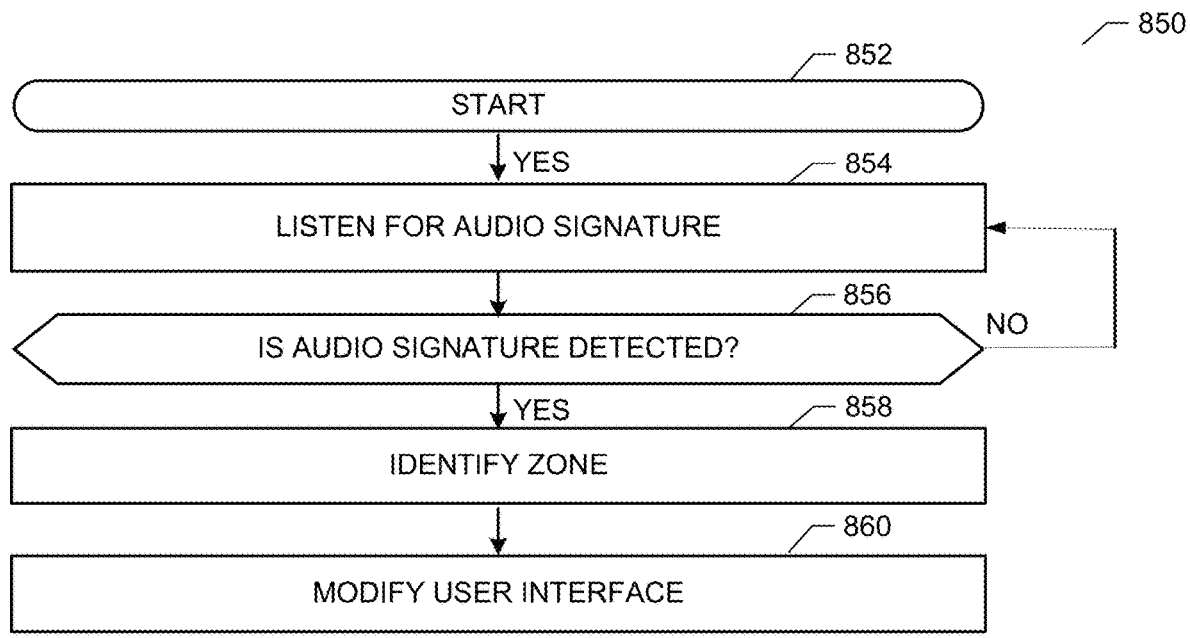
FIG. 8b illustrates a flow diagram of a second example method to facilitate automatic room recognition with acoustic signatures.

FIG. 8b illustrates a flow diagram of an example method 850 to facilitate automatic recognition of a zone using an acoustic signature. At block 854, a controller, such as controller 600 (e.g., a dedicated hardware controller or a controller application running on a smartphone, tablet computer, PC, MAC™, and so on), listens for an acoustic signature. For example the controller can enable the microphone 616 to begin capturing audio and the device recognition module 618 to identify the zone. For example if the acoustic signature corresponds to a playback device, then the current zone can be determined once the player is identified. Alternatively, if the acoustic signature corresponds to a zone, then the zone is immediately identified. Referring to the example system of FIG. 1, if the user using a handheld controller with auto recognition, for example, leaves the "Dining Room" and enters the "Family Room," the controller may detect the acoustic signature from zone player 106 and identify that it is now in the "Family Room."

Signal processing can be used to determine if an acoustic signature is detected in block 856. For example, audio captured from the microphone 616 can be passed through the input interface 614 to the micro controller 606 where demodulation and detection algorithms can determine if an acoustic signature is present.

If an acoustic signature is detected, then the playback device is identified in block 858. For example, the device recognition module 618 of the controller can be used to identify the device. Following the above example with reference to FIG. 1, once the controller has identified the zone as the "Family Room," then the controller can automatically modify the UI to show, for example, the "Now Playing" screen for the "Family Room." Since the display has been automatically updated to reflect the current zone, the user can modify the playback of the current zone without having to navigate the UI to find the current zone.

It is understood that other kinds of UI modification can occur based on an acoustic signature. For example, a controller used in the home and office (and/or vehicle) may modify the UI based on the detected acoustic signature. For the example, a home might provide one type of acoustic signature, whereas the office and/or vehicle might provide a different type of acoustic signature. When a user enters the home (or office) with a controller, for example, the user interface on the controller may responsively display an interface tailored to the home (or office) after detecting the acoustic signature of the home (or office).

It is also understood that acoustic signature detection may be used to determine players within a zone. For example, a rear surround player may transmit an acoustic signature that indicates it is a rear surround player. In some instances, the rear surround player might further distinguish itself from a right or left rear surround player. In some embodiments, triangulation techniques may be used to determine the user orientation. In some embodiments, the acoustic signature and volume level detection may be used to determine where a controller (and user) is located in a zone. For example, the controller may detect a slow decrease in the volume of the acoustic signature of the right channel speaker(s) and therefore determine that the user is moving away from the right channel speakers. Modification to the right channel speakers, including EQ changes, may be made to account for the user's proximity.

VIII. Conclusion

Many embodiments, examples, and advantages have been described herein. For instance, in some embodiments, a first module detects an acoustic signature transmitted by a playback device, and a second module responsively modifies the user interface on a controller. In some embodiments, the first and second modules are on a controller. In some embodiments, the acoustic signature identifies a playback device. In some embodiments, the user interface is modified to show information about the playback device corresponding to the acoustic signature. In some embodiments, the user interface is modifies to show information about the zone associated with the playback device.

In some embodiments, the acoustic signature identifies a zone. In some embodiments, the user interface is modified to show information about the zone corresponding to the acoustic signature.

In some embodiments, the acoustic signature transmitted by a playback device is dynamic. In some embodiments, the acoustic signature changes based on the characteristics of a playback device. In some embodiments, the acoustic signature changes based on the zone configuration. In some embodiments, the acoustic signature changes based on the zone group configuration.

In some embodiments a comparison algorithm is uses to select an acoustic signature when multiple acoustic signatures are detected. In some embodiments, power detection is used in the comparison algorithm.

In some embodiments, the acoustic signature is transmitted simultaneously with audio from the playback device. In some embodiments, the acoustic signature is transmitted when no other audio is played from the playback device.

The description discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

Additionally, reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A system comprising:
a first computing device configured to communicate over at least one data network; and
a second computing device configured to communicate over at least one data network;
the first computing device comprising:
a first network interface that is configured to communicatively couple the first computing device to the second computing device;
at least one first processor;
a first tangible, non-transitory computer-readable medium; and
program instructions stored on the first tangible, non-transitory computer-readable medium that are executable by the at least one first processor such that the first computing device is configured to:
establish, via the first network interface, a communication path with the second computing device;
receive, from the second computing device over the communication path, an indication to begin transmitting an audio tone comprising modulated frequencies that encode identifying information for the first computing device, wherein the identifying information, when detected in the audio tone by the second computing device, causes the second computing device to update a graphical user interface of the second computing device, wherein the updated graphical user interface of the second computing device includes a representation of the first computing device; and based on the received indication, begin transmitting the audio tone comprising modulated frequencies that encode identifying information for the first computing device;

the second computing device comprising:

at least one microphone;

a second network interface that is configured to communicatively couple the second computing device to the first computing device;

at least one second processor;

a second tangible, non-transitory computer-readable medium; and program instructions stored on the second tangible, non-transitory computer-readable medium that are executable by the at least one second processor such that the second computing device is configured to:

transmit, to the first computing device over the communication path, the indication to begin transmitting the audio tone;

detect, via the at least one microphone, the identifying information in the audio tone; and based on the identifying information detected in the audio tone, update the graphical user interface, wherein the updated graphical user interface includes the representation of the first computing device.

2. The system of claim 1, wherein the first computing device further comprises program instructions stored on the first tangible, non-transitory computer-readable medium that are executable by the at least one first processor such that the first computing device is configured to:

after beginning to transmit the audio tone, receive, from the second computing device, a command related to playback of audio content.

3. The system of claim 2, wherein the first computing device further comprises program instructions stored on the first tangible, non-transitory computer-readable medium that are executable by the at least one first processor such that the first computing device is configured to:

based on receiving the command related to playback of audio content, retrieve the audio content from an audio source; and play back the audio content.

4. The system of claim 1, wherein the first computing device further comprises program instructions stored on the first tangible, non-transitory computer-readable medium that are executable by the at least one first processor such that the first computing device is configured to:

after beginning to transmit the audio tone, receive, from the second computing device, configuration information for the first computing device; and based on the received configuration information, update a configuration of the first computing device.

5. The system of claim 4, wherein the program instructions stored on the first tangible, non-transitory computer-readable medium that are executable by the at least one first processor such that the first computing device is configured to receive, from the second computing device, the configuration information comprise program instructions stored on the first tangible, non-transitory computer-readable medium that are executable by the at least one first processor such that the first computing device is configured to receive, from the second computing device via the communication path with the second computing device, the configuration information.

6. The system of claim 4, wherein the configuration information comprises network configuration information.

7. The system of claim 1, wherein the identifying information in the audio tone is modulated about a carrier frequency.

8. The system of claim 1, wherein the identifying information comprises a model of the first computing device.

9. The system of claim 1, wherein the audio tone is outside a human audible frequency range.

10. The system of claim 9, wherein the audio tone is an inaudible audio tone, and wherein the first computing device further comprises program instructions stored on the first tangible, non-transitory computer-readable medium that are executable by the at least one first processor such that the first computing device is configured to:

while transmitting the inaudible audio tone, play back an audible audio tone that is inside the human audible frequency range.

11. The system of claim 1, wherein the second computing device further comprises program instructions stored on the second tangible, non-transitory computer-readable medium that are executable by the at least one second processor such that the second computing device is configured to:

based on the detected audio tone, determine that the second computing device is within a zone that includes the first computing device.

12. The system of claim 1, wherein the program instructions stored on the second tangible, non-transitory computer-readable medium that are executable by the at least one second processor such that the second computing device is configured to update the graphical user interface comprise program instructions stored on the second tangible, non-transitory computer-readable medium that are executable by the at least one second processor such that the second computing device is configured to update the graphical user interface to include an indication of a current status of the first computing device.

13. The system of claim 12, wherein the indication of the current status of the first computing device comprises an indication that the first computing device is controllable by the second computing device for playback of audio content.

14. The system of claim 1, wherein the program instructions stored on the second tangible, non-transitory computer-readable medium that are executable by the at least one second processor such that the second computing device is configured to detect the identifying information in the audio tone comprise program instructions stored on the second tangible, non-transitory computer-readable medium that are executable by the at least one second processor such that the second computing device is configured to demodulate the modulated frequencies in the audio tone.

15. The system of claim 1, wherein the audio tone further comprises a sound pressure level that encodes the identifying information for the first computing device.

16. A first computing device comprising:

a network interface that is configured to communicatively couple the first computing device to a second computing device;

at least one processor;

a tangible, non-transitory computer-readable medium; and program instructions stored on the tangible, non-transitory computer-readable medium that are executable by the at least one processor such that the first computing device is configured to:
- establish, via the network interface, a communication path with the second computing device;
- receive, from the second computing device over the communication path, an indication to begin transmitting an audio tone comprising modulated frequencies that encode identifying information for the first computing device, wherein the identifying information, when detected in the audio tone by the second computing device, causes the second computing device to update a graphical user interface of the second computing device, wherein the updated graphical user interface of the second computing device includes a representation of the first computing device; and
- based on the received indication, begin transmitting the audio tone comprising modulated frequencies that encode identifying information for the first computing device.

17. The first computing device of claim 16, further comprising program instructions stored on the tangible, non-transitory computer-readable medium that are executable by the at least one processor such that the first computing device is configured to:
- after beginning to transmit the audio tone, receive, from the second computing device, a command related to playback of audio content.

18. The first computing device of claim 17, further comprising program instructions stored on the tangible, non-transitory computer-readable medium that are executable by the at least one processor such that the first computing device is configured to:
- based on receiving the command related to playback of audio content, retrieve the audio content from an audio source; and
- play back the audio content.

19. The first computing device of claim 16, further comprising program instructions stored on the tangible, non-transitory computer-readable medium that are executable by the at least one processor such that the first computing device is configured to:
- after beginning to transmit the audio tone, receive, from the second computing device, configuration information for the first computing device; and
- based on the received configuration information, update a configuration of the first computing device.

20. The first computing device of claim 19, wherein the program instructions stored on the tangible, non-transitory computer-readable medium that are executable by the at least one processor such that the first computing device is configured to receive, from the second computing device, the configuration information comprise program instructions stored on the tangible, non-transitory computer-readable medium that are executable by the at least one processor such that the first computing device is configured to receive, from the second computing device via the communication path with the second computing device, the configuration information.

21. The first computing device of claim 19, wherein the configuration information comprises network configuration information.

22. The first computing device of claim 16, wherein the identifying information in the audio tone is modulated about a carrier frequency.

23. The first computing device of claim 16, wherein the identifying information comprises a model of the first computing device.

24. The first computing device of claim 16, wherein the audio tone is outside a human audible frequency range.

25. The first computing device of claim 24, wherein the audio tone is an inaudible audio tone, and wherein the first computing device further comprises program instructions stored on the tangible, non-transitory computer-readable medium that are executable by the at least one processor such that the first computing device is configured to:
- while transmitting the inaudible audio tone, play back an audible audio tone that is inside the human audible frequency range.

26. A second computing device comprising:
- at least one microphone;
- a network interface that is configured to communicatively couple the second computing device to a first computing device;
- at least one processor;
- a tangible, non-transitory computer-readable medium; and
- program instructions stored on the tangible, non-transitory computer-readable medium that are executable by the at least one processor such that the second computing device is configured to:
  - establish, via the network interface, a communication path with the first computing device;
  - transmit, to the first computing device over the communication path, an indication to begin transmitting an audio tone comprising modulated frequencies that encode identifying information for the first computing device;
  - detect, via the at least one microphone, the identifying information in the audio tone; and
  - based on the identifying information detected in the audio tone, update a graphical user interface of the second computing device, wherein the updated graphical user interface includes a representation of the first computing device.

27. The second computing device of claim 26, further comprising program instructions stored on the tangible, non-transitory computer-readable medium that are executable by the at least one processor such that the second computing device is configured to:
- based on the detected audio tone, determine that the second computing device is within a zone that includes the first computing device.

28. The second computing device of claim 26, wherein the program instructions stored on the tangible, non-transitory computer-readable medium that are executable by the at least one processor such that the second computing device is configured to update the graphical user interface comprise program instructions stored on the tangible, non-transitory computer-readable medium that are executable by the at least one processor such that the second computing device is configured to update the graphical user interface to include an indication that the first computing device is controllable by the second computing device for playback of audio content.

29. The second computing device of claim 26, wherein the program instructions stored on the tangible, non-transitory computer-readable medium that are executable by the at least one processor such that the second computing device is configured to detect the identifying information in the audio tone comprise program instructions stored on the tangible, non-transitory computer-readable medium that are executable by the at least one processor such that the second computing device is configured to demodulate the modulated frequencies in the audio tone.

30. The second computing device of claim 26, wherein the audio tone further comprises a sound pressure level that encodes the identifying information for the first computing device.

\* \* \* \* \*